United States Patent
Gatehouse

Patent Number: 5,988,606
Date of Patent: Nov. 23, 1999

[54] HYDRAULIC STRUT WITH OVER-PRESSURE CONTROL

[75] Inventor: Colin P. F. K. Gatehouse, Long Beach, Calif.

[73] Assignee: McDonnell Douglas Corporation, Huntington Beach, Calif.

[21] Appl. No.: 09/005,492

[22] Filed: Jan. 12, 1998

[51] Int. Cl.$^6$ .................................................. F16F 9/342
[52] U.S. Cl. .................................. 267/64.22; 267/64.23; 267/64.25; 267/64.26; 188/287
[58] Field of Search ............................ 267/64.15, 64.22, 267/64.23, 64.26, 64.25; 188/287; 244/104 FP

[56] References Cited

U.S. PATENT DOCUMENTS

| | | | |
|---|---|---|---|
| 2,451,171 | 10/1948 | Mullen | 267/64.22 |
| 2,735,674 | 2/1956 | Smith et al. | 267/64.15 |
| 3,598,207 | 8/1971 | Hartel | 188/289 |
| 3,724,832 | 4/1973 | Ceska | 267/64.22 |
| 3,844,544 | 10/1974 | Keilholz | 267/64.22 |
| 3,888,436 | 6/1975 | Sealey | 188/314 |
| 4,082,255 | 4/1978 | Masclet et al. | 267/64.25 |
| 4,273,303 | 6/1981 | Somm | 244/104 FP |
| 4,593,890 | 6/1986 | Van Der Laarse | 267/64.25 |
| 4,623,049 | 11/1986 | Warren | 188/281 |
| 5,110,068 | 5/1992 | Grande et al. | 204/102 SL |
| 5,310,140 | 5/1994 | Veaux et al. | 204/104 FP |

OTHER PUBLICATIONS

Rockwell Overload Relief Valve for OV–10A.

Primary Examiner—Mark T. Le
Assistant Examiner—Thomas J. Williams
Attorney, Agent, or Firm—Alston & Bird LLP

[57] ABSTRACT

A hydraulic strut having a damping rate that is variable includes a bypass valve which is operated to open and close by a gas spring supported within the piston of the strut. A main orifice plate divides an oil-filled cavity within the strut into first and second oil chambers, the orifice plate defining a primary orifice for passage of oil between the chambers. The gas spring includes an inner cylinder member affixed to the end wall of the piston, and a diaphragm slidably mounted within the cylinder member, the cylinder member and diaphragm defining a pressurized gas-filled cavity. The diaphragm supports a valve pin which is slidable within a passage in a tubular valve body, the valve body being fixed with respect to the piston, and the passage extending between the first and second oil chambers. Secondary orifices in the valve body communicate with oil in the first oil chamber. The valve pin includes openings which are alignable with the secondary orifices, the openings extending into an axial hole in the valve pin, the axial hole being in communication with the passage in the valve body. Compression of the strut causes compression of the gas spring, which causes movement of the diaphragm so as to move the valve pin within the valve body and thereby bring the openings in the valve pin into alignment with the secondary orifices in the valve body. Oil is thereby allowed to bypass the primary orifice and flow through the bypass valve between the oil chambers.

22 Claims, 4 Drawing Sheets

HYDRAULIC STRUT WITH OVER-PRESSURE CONTROL

FIELD OF THE INVENTION

The present invention relates to hydraulic struts for use in vehicle suspension systems and, more particularly, to a hydraulic strut for use in an aircraft landing gear in which the strut includes an over-pressure relief valve.

BACKGROUND OF THE INVENTION

Shock-absorbing struts are commonly used in vehicle suspension systems for absorbing and damping transient loads imposed on the suspension system. Two types of struts are commonly used. So-called "oleo" struts have an internal oil-filled cavity and an orifice through which oil flows upon compression of the strut, such that motion of the piston is damped by the flow of viscous oil through the orifice. The other type of strut in common use is the "oleo-pneumatic" strut which acts as both a damper and a spring by means of an oil-filled cavity and a compressible gas-filled chamber. In both types of devices, the degree of damping is chosen so as to effectively manage the types of transient loads expected to be imposed on the device during use.

Shock struts for use in aircraft must be able to absorb and damp loads imposed during a number of diverse use regimes, including landing, taxi, and takeoff. Unfortunately, a damping rate which may be suitable for absorbing the types of loads experienced during landing may not be suitable for damping the types of loads experienced during taxi. Thus, the design of the strut is necessarily compromised between the disparate requirements of the landing and taxi modes. Consequently, the rebound damping characteristics of the strut may be less than ideal during landing.

Aircraft rebound occurs when the aircraft, after the landing gear shock struts have been compressed by the forces of initial touchdown on the runway, is propelled back upward by the spring action of the landing gear shock struts. If shock strut rebound occurs too rapidly and forcefully, the aircraft may be propelled upward with enough energy to cause it to leave the runway. This is undesirable because during the rebound period, braking efficiency is reduced, resulting in a greater runway length required to bring the aircraft to a stop. Furthermore, should the wing lift spoilers extend on initial touchdown, and the aircraft then rebound with the spoilers still extended, subsequent ground loads may be unnecessarily severe as the aircraft touches down a second time.

Accordingly, aircraft shock struts are sometimes designed to prevent substantial rebound by building a high degree of damping into the strut. Such "stiff" shock struts, however, tend to transmit much of the transient loads imposed on the landing gear by surface discontinuities such as bumps on the ground during taxiing of the aircraft, resulting in passenger discomfort and possible structural damage to the strut if the piston bottoms in the cylinder.

As a partial solution to some of the problems described above, dual-rate shock struts have been developed which have two different damping rates depending on how hard the strut is compressed. For example, shock struts having over-pressure relief valves are known, an example being described in U.S. Pat. No. 3,598,207 issued to Hartel. The aircraft strut described in the Hartel patent includes an oil bypass valve between the high-pressure oil chamber and the low-pressure oil chamber of the strut. The bypass valve is held closed by compression springs in a relaxed state of the strut and during initial compression of the strut, such as at initial landing touchdown, and accordingly the damping rate of the strut is high. Furthermore, the strut is configured to maintain the bypass valve closed until the aircraft has stopped its vertical sink velocity and the strut piston movement has ceased, thereby equalizing the oil pressures in the two chambers. However, the bypass valve is designed to open when a predetermined increased pressure exists in both the high-pressure and low-pressure oil chambers, such as during the last portion of piston stroke during landing as well as during taxiing of the aircraft. Accordingly, the damping rate of the strut is reduced during taxi relative to the damping rate during landing. The Hartel strut, however, does not solve the strut rebound problem because the bypass valve is open as the piston begins to be extended following the initial compression stroke, and remains open until the pressure in the oil chambers falls below the predetermined value such that the compression springs can overcome the fluid pressure forces acting on the bypass valve plunger and close the valve. Thus, the strut would have an undesirable rebound tendency.

SUMMARY OF THE INVENTION

The invention overcomes the drawbacks of conventional shock struts noted above by providing a shock strut having a gas spring-operated bypass valve which opens during initial compression of the strut so as to increase the flow rate of oil within the strut and thereby reduce the damping rate of the strut. Consequently, piston travel is increased during the initial compression of the strut, such as when the aircraft first touches down on a runway. As the strut continues to be compressed, the bypass valve then closes so as to increase the damping rate of the strut and thereby slow the piston. Once strut compression ceases, rebound tendency is reduced by the higher damping rate as well as by the longer piston stroke over which resistive damping can occur. To manage loads during taxi operations, the strut is configured such that the bypass valve is normally closed during taxi. Any disturbing loads imposed by the runway which exceed a predetermined magnitude cause the bypass valve to open so as to reduce damping. This reduced damping permits the piston to travel without transmitting to the aircraft the full force imposed by the ground disturbances.

The invention thus provides a variable damping-rate strut in which the damping rate is controlled by action of a bypass valve operated by an internal gas spring. Accordingly, whereas the strut disclosed in the Hartel patent referred to above includes a simple on-off valve providing a dual-mode damping and spring response, the strut of the present invention provides damping and spring response characteristics that are progressive rather than merely on-off. Further, the spring response is non-linear by virtue of the gas spring, as opposed to the generally linear spring response provided by mechanical compression springs such as that used in the Hartel strut. The bypass valve porting is designed so as to take advantage of the characteristics of the gas spring.

To these ends, the strut of the present invention includes a hollow cylinder having a closed end and an open end and a hollow piston having a closed end and an open end, the open end of the piston telescopingly received within the cylinder, the piston and cylinder defining an oil-filled cavity therebetween; an orifice plate supported within the strut and dividing the oil-filled cavity into first and second oil chambers, the orifice plate defining a primary orifice for passage of oil between the oil chambers; a gas spring defined by walls forming a gas chamber within one of the piston and the cylinder, the walls sealing the gas chamber from the oil chambers and including a diaphragm which is moveable with respect to the one of the piston and the cylinder which houses the gas spring; and a bypass valve operatively connected to the diaphragm, the bypass valve connecting the first and second oil chambers, the bypass valve including a first valve member supported by the diaphragm for movement therewith and a second valve member fixed with respect to the one of the piston and the cylinder, compression and extension of the strut causing compression and expansion of the gas chamber and, consequently, movement of the diaphragm so as to operate the bypass valve to open and close.

According to a preferred embodiment of the invention, the first valve member comprises a valve pin and the second valve member comprises a valve body having a central passage in which the valve pin is telescopingly received. The central passage of the valve body extends between the first and second oil chambers. The valve body includes a sidewall with a secondary orifice extending therethrough into the central passage. The secondary orifice is exposed to oil in the first chamber when the strut is uncompressed and throughout most of the range of strut compression. The valve pin prevents oil flow through the secondary orifice when the bypass valve is closed, and slides within the central passage to allow oil flow through the secondary orifice when the bypass valve is opened so as to increase oil flow rate within the strut and thereby reduce the damping rate of the strut. The diaphragm preferably is slidably mounted within a cylinder member affixed to the closed end of the piston, and the cylinder member supports the valve body. The orifice plate preferably is annular, having a central hole therethrough, and the valve body of the bypass valve extends through the central hole, the valve body and orifice plate thereby defining the primary orifice therebetween for passage of oil between the first and second oil chambers.

In a preferred embodiment of the invention, the cylindrical outer wall of the cylinder member supports a valve body support member at the end of the cylinder member opposite from the closed end of the piston. The valve body support member extends generally radially inward from the outer wall of the cylinder member and attaches at its inner radius to the valve body of the bypass valve. The support member includes a diaphragm stop which extends into the cylinder member, the diaphragm abutting the diaphragm stop to define a fully extended position of the valve pin when the strut is in an uncompressed state. The bypass valve preferably is configured so that it is closed in the fully extended position of the valve pin. Thus, upon initial compression of the strut from its uncompressed state, the bypass valve is closed such that only normal flow of oil through the primary orifice occurs. Accordingly, damping of the strut is high during the beginning of compression of the strut.

The valve pin preferably has a blind axial hole in its free end and first and second openings through its sidewall which are axially spaced apart along the valve pin and extend into the axial hole. The valve body preferably has first and second secondary orifices through its sidewall which are axially spaced apart to be simultaneously alignable with the first and second openings of the valve pin when the bypass valve is fully opened. The two pairs of passages in the valve pin and valve body allow the bypass valve to open gradually. The cylinder member of the gas spring includes a closed end adjacent the closed end of the piston, and the diaphragm abuts the closed end of the cylinder member in a fully compressed position of the valve pin. The valve pin and valve body are configured such that the first secondary orifice of the valve body is closed by the outer surface of the valve pin, and the second secondary orifice of the valve body and second opening of the valve pin are aligned, when the valve pin is in the fully compressed position, the bypass valve thus being half open in this position. Furthermore, the strut is designed such that during taxi, when the strut is substantially but not fully compressed, the bypass valve is normally closed. Transient disturbing loads imposed on the strut by ground discontinuities cause the valve pin to be moved toward the fully compressed position, with the result that the bypass valve assumes the half-open position to permit bypass flow of oil from the first oil chamber to the second oil chamber, resulting in reduced damping of the strut. Consequently, the strut transmits less of the forces imposed by the ground disturbances than would otherwise be the case with a strut having a single damping rate.

In a further preferred embodiment of the invention, the orifice plate and bypass valve are configured such that the second opening of the valve pin and second secondary orifice of the valve body pass through the central hole of the orifice plate upon full compression of the strut so as to render the bypass valve inoperative and thereby maximize damping of the strut.

According to a further preferred embodiment of the invention, the strut includes a second gas spring having an orifice support tube affixed to the closed end of the cylinder and a second diaphragm slidably mounted within the orifice support tube to define a second gas chamber which is sealed from the oil chambers. The orifice support tube supports the orifice plate. The end of the valve body which extends through the central hole of the orifice plate supports a second diaphragm stop for the second diaphragm to abut in a fully extended (uncompressed) state of the second gas spring.

In an alternative embodiment of the invention, the valve body includes axial grooves in its outer cylindrical surface, the outer surface making sliding contact with the inner edge of the central hole of the orifice plate during compression and extension of the strut. The grooves define the primary orifice for passage of oil between the oil chambers. The depth of the grooves can be varied along the length of the valve body, such that the size of the primary orifice can be varied as a function of the position of the main piston with respect to the cylinder. The strut damping rate can thereby be tailored to have any desired relationship to piston position.

The above and other objects and advantages of the invention will become more apparent from the appended drawings and the following detailed description thereof.

DETAILED DESCRIPTION OF THE DRAWINGS

FIGS. 1–6 depict a shock strut 10 embodying the principles of the invention. The strut includes a hollow cylinder 12 having a closed end 14 and an open end 16, and a hollow piston 18 having a closed end 20 and an open end 22. The piston 18 is telescopingly received open-end first within the open end 16 of the cylinder. Oil under pressure fills the cavity 23 defined between the closed ends 14 and 20, except for the spaces occupied by a pair of gas springs described below. A seal ring 24 secured to the cylinder 12 adjacent its open end 16 between the piston 18 and cylinder 12, and a similar seal ring 26 secured to the piston 18 adjacent its open end 22 between the piston 18 and cylinder 12, seal the oil-filled cavity 23 within the strut to prevent oil from escaping therefrom.

Figure 1:
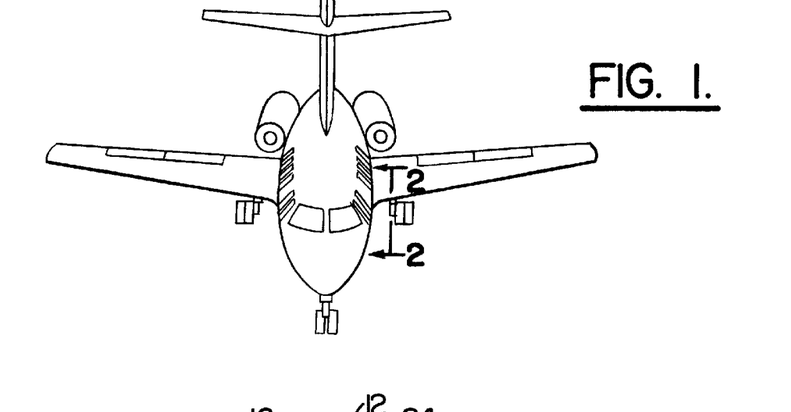
FIG. 1 is a schematic perspective view of an aircraft showing wheels affixed to shock struts to form the landing gear for the aircraft.
Figure 2:
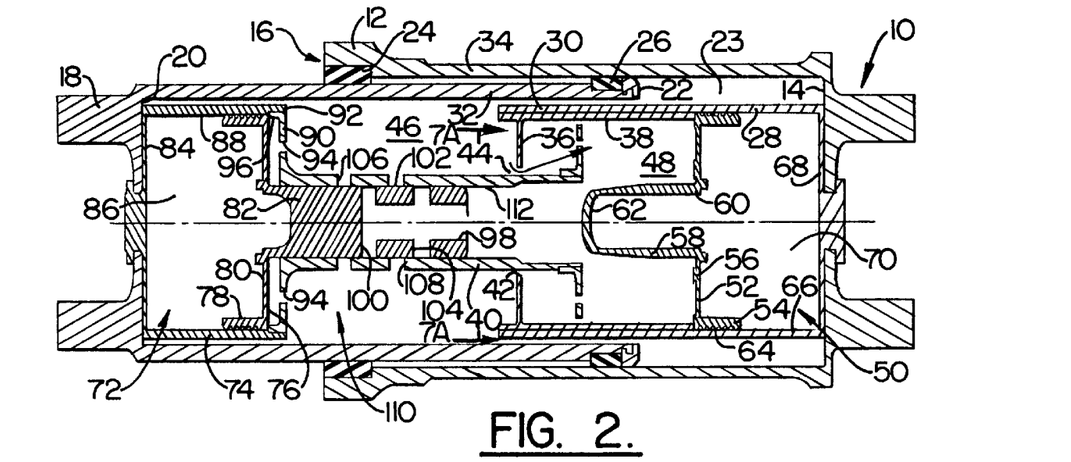
FIG. 2 is a cross-sectional view taken along line 2—2 of FIG. 1, showing the strut in a relaxed, uncompressed state in which the bypass valve is closed.

An orifice support tube 28 is attached within the cylinder 12 to the closed end 14 thereof. The orifice support tube 28 has a cylindrical side wall 30 whose diameter is less than the diameter of the piston 18, such that the side wall 32 of the piston 18 extends between the cylinder side wall 34 and the side wall 30 of the orifice support tube 28. An annular main orifice plate 36 is supported within the orifice support tube 28. The main orifice plate 36 attaches at its outer radius to a cylindrical member 38 which is telescopingly received within the orifice support tube 28 and is securely fixed therein. A cylindrical valve body 40, supported by the piston 18 in a manner to be described below, extends through the central hole 42 of the annular main orifice plate 36. An annular primary orifice 44 exists between the inner edge of the hole 42 and the outer surface of the valve body 40. The main orifice plate 36 divides the oilfilled cavity 23 into a first oil chamber 46 and a second oil chamber 48. The first oil chamber 46 extend from the closed end 14 of the cylinder 12, through a gap between the side wall 32 of piston 18 and the side wall 30 of orifice support tube 28, and into the space bounded by the orifice plate 36 and the closed end 20 of the piston 18. Thus, it will be appreciated that upon compression of the piston 18 into the cylinder 12, the volume of the first oil chamber 46 decreases, thereby increasing the pressure within first oil chamber 46 such that a pressure differential exists across the orifice plate 36. Oil therefore flows from first oil chamber 46 through the primary orifice 44 into the second oil chamber 48. As a result, the pressure within the second oil chamber 48 begins to increase.

This increasing pressure in second oil chamber 48 causes compression of a gas spring 50 disposed within the orifice support tube 28. The gas spring 50 is formed by a diaphragm 52 which is slidably mounted within the orifice support tube 28. The diaphragm 52 is formed by an outer cylindrical portion 54, an annular portion 56 attached to the outer cylindrical portion 54, and an inner cylindrical portion 58 having an open end 60 which attaches to the inner edge of the annular portion 56 and a closed end 62 which extends toward the closed end 20 of the piston 18. The outer cylindrical portion 54 includes a plurality of seal teeth 64 which make sealing contact with the inner surface 66 of orifice support tube 28. The orifice support tube 28 includes a closed end wall 68 adjacent the closed end 14 of cylinder 12. An interior cavity 70 is defined between diaphragm 52, the side walls 30 of orifice support tube 28, and the end wall 68 of orifice support tube 28, and is filled with a pressurized gas. The pressure of the gas in cavity 70 exceeds the pressure in the first and second oil chambers 46 and 48 when the strut 10 is in an uncompressed state. Consequently, in this condition, the pressure differential across diaphragm 52 forces the diaphragm 52 toward the closed end 20 of piston 18, the outer cylindrical portion 54 abutting the end of cylinder member 38 closest to the end wall 68 of orifice support tube 28. This position of diaphragm 52 represents a fully extended position of the gas spring 50.

Upon compression of the strut 10, the pressure within second oil chamber 48 increases, as previously described. When the pressure in second oil chamber 48 exceeds the pressure in the cavity 70 of gas spring 50, the diaphragm 52 begins to be compressed toward the end wall 68. When movement of piston 18 ceases, oil flow through the primary orifice 44 ceases, and therefore movement of diaphragm 52 ceases. Upon removal of the force compressing the strut 10, the gas pressure within gas spring 50 causes the diaphragm 52 to be extended back to its fully extended position, causing the pressure in second oil chamber 48 to exceed that in first oil chamber 46. Thus, oil flows in a reverse direction through primary orifice 44 into first oil chamber 46. The increasing volume of oil in first oil chamber 46 in turn causes the piston 18 to be extended back to its original uncompressed position. The rate at which the piston 18 can move with respect to the cylinder 12 is governed at least in part by the rate of oil flow through primary orifice 44, which in turn is a function of the size of orifice 44 and the viscosity of the oil. It will be appreciated, therefore, that the orifice 44 provides energy dissipation or damping, and the gas spring 50 provides energy storage within the strut 10.

These damping and spring functions of strut 10, as thus far described, are shared by all oleo-pneumatic struts. However, most such struts have only a single damping rate because they have a single fixed orifice. In contrast, the strut 10 includes features which give it a variable damping rate as a function of the degree of compression of the strut 10. More particularly, the strut 10 includes a second gas spring 72 contained within piston 18. The second gas spring 72 is formed by a hollow cylinder member 74 affixed to the end wall 20 of piston 18, and a second diaphragm 76 which is slidably mounted within cylinder member 74. The second diaphragm 76 includes an outer cylindrical portion 78, an annular portion 80 which attaches to the outer cylindrical portion 78 and extends radially inward therefrom, and a cylindrical valve pin 82 which attaches to the inner radius of annular portion 80. The cylinder member 74 includes a closed end wall 84 adjacent the closed end 20 of piston 18. The cavity 86 defined by end wall 84, side wall 88 of cylinder member 74, and second diaphragm 76, is filled with a compressed gas at a greater pressure than the pressure in oil chambers 46 and 48 when the strut is uncompressed. An annular valve body support member 90 is secured within the open end 92 of the cylinder member 74. The support member 90 extends generally radially inward from the cylinder member 74 and attaches at its inner radius to the valve body 40. The support member 90 includes equalizing orifices 94 for communicating pressure in oil chamber 46 to the second diaphragm 76. The support member 90 includes a cylindrical portion 96 which extends into the cylinder member 74 to define a stop for the second diaphragm 76.

When the strut 10 is uncompressed, the pressure in cavity 86 forces the second diaphragm 76 against the diaphragm stop 96. This position represents the fully extended position of the diaphragm 76 and the valve pin 82.

The valve pin 82 is telescopingly received within the valve body 40. A blind hole 98 extends from the free end of valve pin 82 generally axially toward the closed end 20 of piston 18. The valve pin 82 further includes a plurality of first openings 100 which extend from the outer cylindrical surface 102 of valve pin 82 generally radially into the axial hole 98. Axially spaced from first openings 100 toward the free end of valve pin 82 are a plurality of second openings 104 which extend from outer surface 102 into axial hole 98.

The valve body 40 similarly includes a plurality of first secondary orifices 106 and a plurality of second secondary orifices 108 axially spaced from first secondary orifices 106 by the same spacing as the first and second openings 100 and 104 of valve pin 82. It will thus be appreciated that valve pin 82 and valve body 40 comprise a bypass valve 110 which will allow flow of oil from first oil chamber 46 into second oil chamber 48 upon alignment of any of openings 100 and 104 with any of orifices 106 and 108.

FIG. 2 depicts the shock strut 10 in a relaxed uncompressed condition. In this condition, the bypass valve 110 is configured to be closed, with first openings 100 in valve pin 82 located between the first and second secondary orifices 106 and 108 in valve body 40. The inner surface 112 of valve body 40 makes sealing contact with outer surface 102 of valve pin 82 to prevent oil flow into axial passage 98 of valve pin 82. Thus, as the initially uncompressed strut 10 begins to be compressed by a load imposed on the strut, oil flows from first oil chamber 46 into second oil chamber 48 only through the primary orifice 44. The damping rate of the strut 10 at the beginning of a compression is therefore relatively high.

Figure 3:
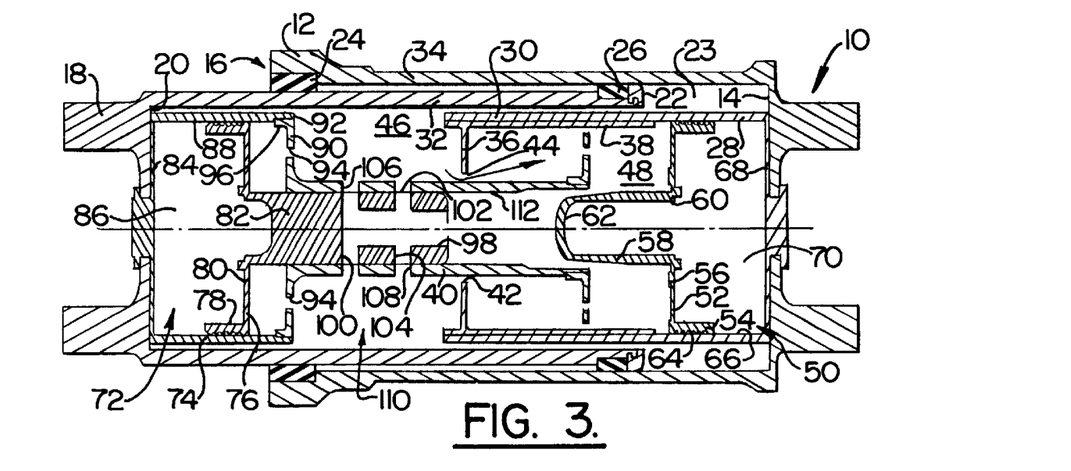
FIG. 3 is a view similar to FIG. 2, showing the strut in a state of partial compression in which the bypass valve has opened.

FIG. 3 depicts the shock strut 10 which is partially compressed from the position shown in FIG. 2. Increased pressure within first oil chamber 46 causes the second diaphragm 76 to be compressed toward end wall 84 of cylinder member 74, thereby bringing the openings in valve pin 82 and the secondary orifices in valve body 40 into alignment. Oil therefore flows through secondary orifices 106 and 108, through openings 100 and 104, into axial passage 98 and into second oil chamber 48. The increased flow rate of oil between the chambers 46 and 48 results in reduced damping rate of the strut 10.

Figure 4:
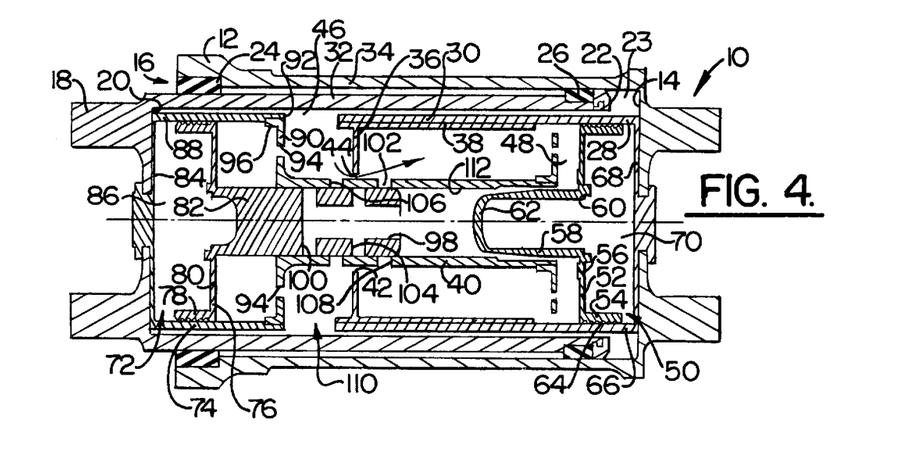
FIG. 4 is a view similar to FIG. 2, showing the strut in a taxi-closure mode in which the strut is substantially compressed and the bypass valve has once again closed.

This reduced damping rate continues until the strut 10 is further compressed to the position shown in FIG. 4. When the strut 10 is used in an aircraft landing gear, the strut 10 advantageously is designed such that during normal taxi of the aircraft, and absent any disturbing forces caused by ground discontinuities, the strut 10 assumes the position shown in FIG. 4. As shown, the second diaphragm 46 has been further compressed toward end wall 84, causing the bypass valve 110 to close. Thus, in normal taxi, the strut 10 has a relatively higher damping rate, since oil can flow only through the primary orifice 44. In this position, the second openings 104 in valve pin 82 are located between the first and second secondary orifices 106 and 108 in valve body 40. It will also be noted that the second secondary orifices 108 and the second openings 102 have passed through the primary orifice 44, and therefore are ineffective for providing bypass flow from first oil chamber 46 to second oil chamber 48.

Figure 5:
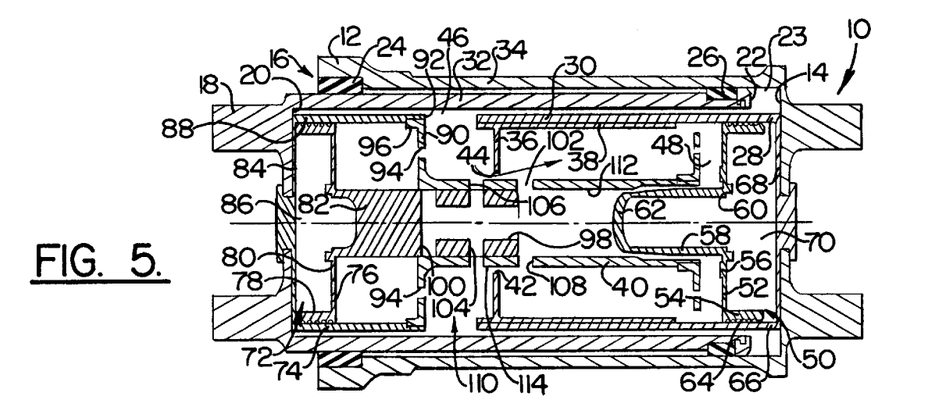
FIG. 5 is a view similar to FIG. 4, showing the strut in a taxi-closure made in which the strut has been subjected to a disturbing force, causing the bypass valve to be opened.

FIG. 5 depicts the strut 10 in a taxi mode, but with the strut having been subjected to a disturbing force tending to compress the strut. The second diaphragm 76 has been fully compressed against the end wall 84. As a result, the first openings 100 in valve pin 82 and first secondary orifices 106 in valve body 40 have become aligned to permit oil to bypass the main orifice 44 and flow through the bypass valve 110 into second oil chamber 48. Thus, when the taxing aircraft encounters a ground discontinuity which subjects the landing gear to a disturbing compressive force, the bypass valve 110 opens to reduce the damping rate of the strut 10. This allows the piston 18 to be compressed without transmitting the full force of the disturbing force to the aircraft. Moreover, bypass flow in the reverse direction is also possible through both sets of secondary orifices 106 and 108, so that the strut can re-extend quickly after the wheels have passed over the bump causing the disturbing force.

Figure 8:
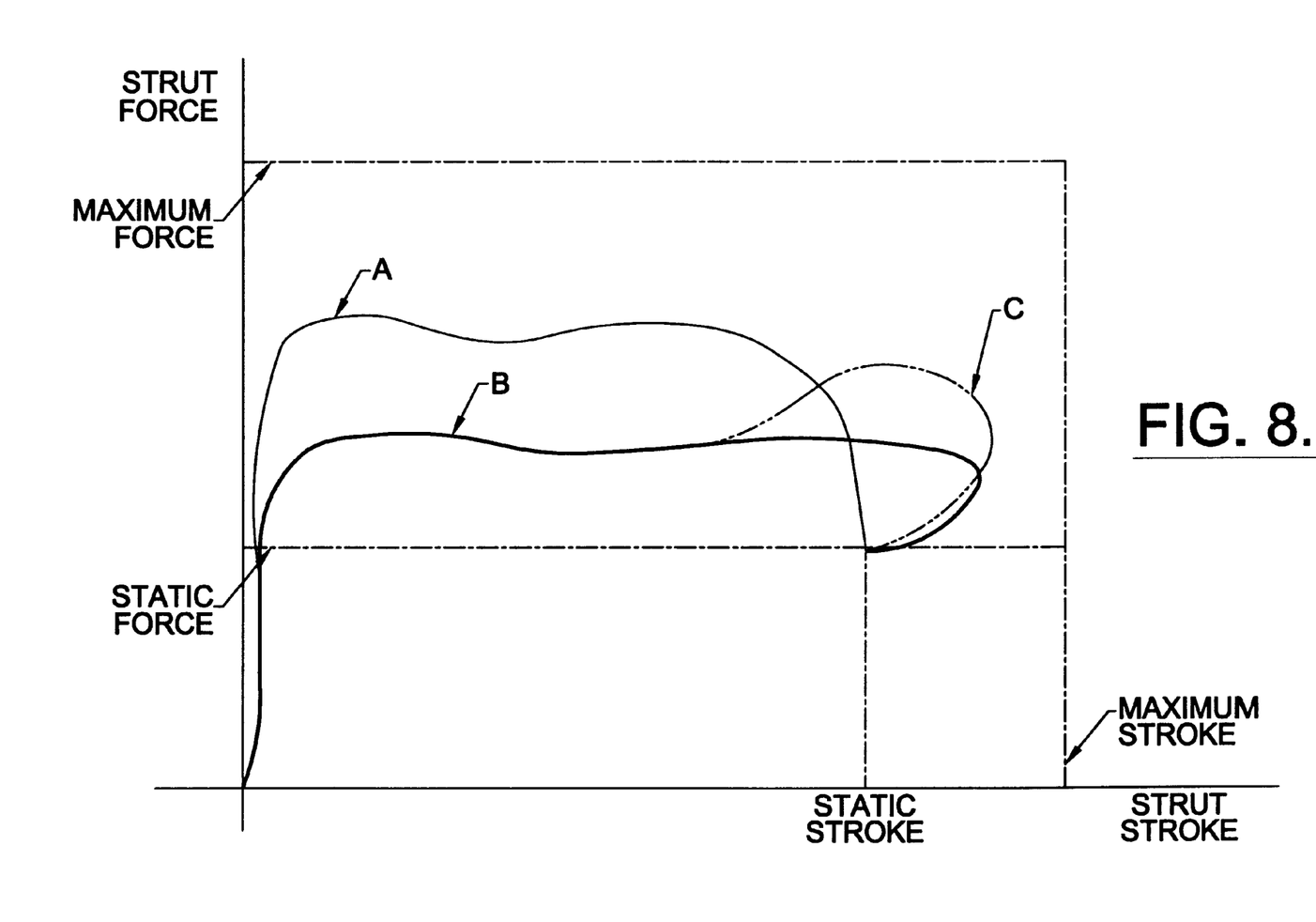
FIG. 8 is a graph schematically illustrating load-stroke curves for both a conventional shock strut and a shock strut in accordance with the present invention during a landing and roll-out of an aircraft.

FIG. 8 schematically depicts the force-responsive characteristics of the shock strut 10. A force-stroke curve for a conventional shock strut is indicated by the curve A for a typical landing and roll-out of an aircraft. Curve B shows the force-stroke curve, for the same landing and roll-out, achieved by a shock strut in accordance with the present invention. It will be noted that the shock strut of the invention provides a lower load over a longer stroke than to provided by the conventional shock strut, by virtue of the opening of the bypass valve. FIG. 8 also depicts what happens when the aircraft landing gear encounters a bump during roll-out of the aircraft as the shock strut is approaching its static state of force and stroke. As indicated by curve C, the bump causes a relatively gradual increase in strut force by virtue of the bypass valve which opens to permit the piston to travel over a greater stroke so that the entire force transient caused by the bump is not transmitted to the aircraft.

Figure 6:
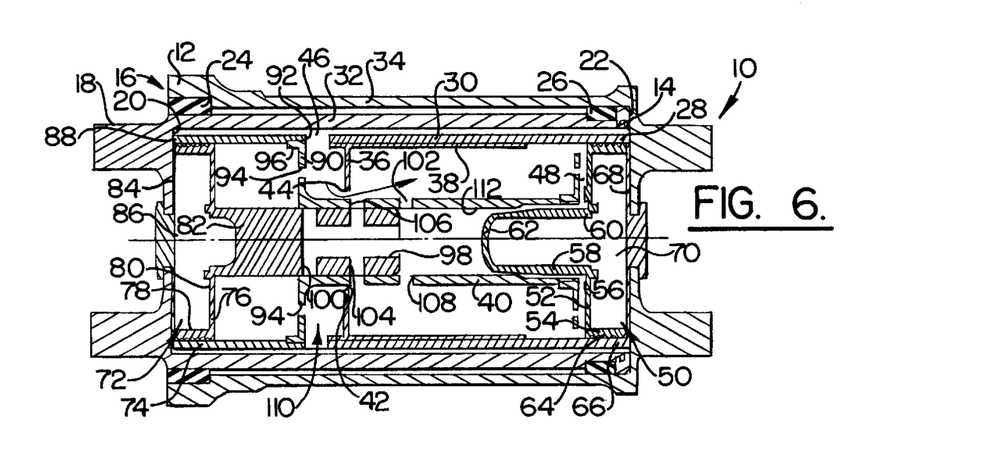
FIG. 6 is a view similar to FIG. 2, showing the strut in a fully compressed state in which the bypass valve has passed through the primary orifice plate and thereby been rendered inoperative for passing oil.

FIG. 6 depicts the strut 10 in a fully compressed condition. It will be noted that both first and second secondary orifices 106 and 108 in valve body 40 have passed through the primary orifice 44, and therefore the bypass valve 110 is inoperative for passing oil between the chambers 46 and 48. Thus, damping in this condition of the strut 10 is relatively high. Furthermore, damping may be further increased by appropriate contouring of the outer surface 114 of valve body 10 such that the size of the primary orifice 44 is decreased when the piston 18 approaches a fully compressed condition.

Figure 7A:
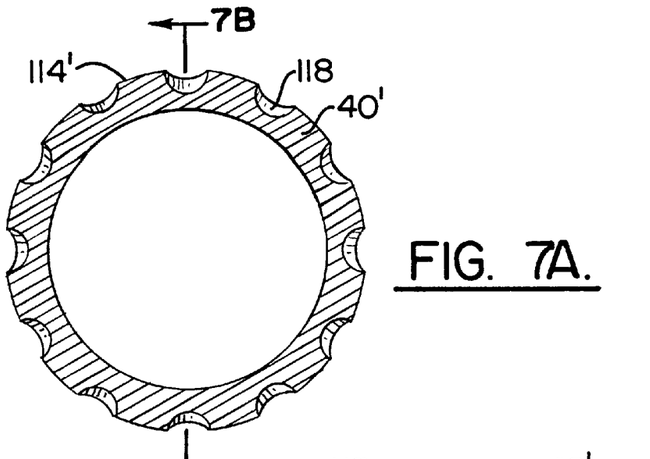
FIG. 7A is a cross-sectional view through an alternative valve body of the bypass valve normal to its longitudinal axis, showing axial grooves in the outer surface of the valve body.
Figure 7B:
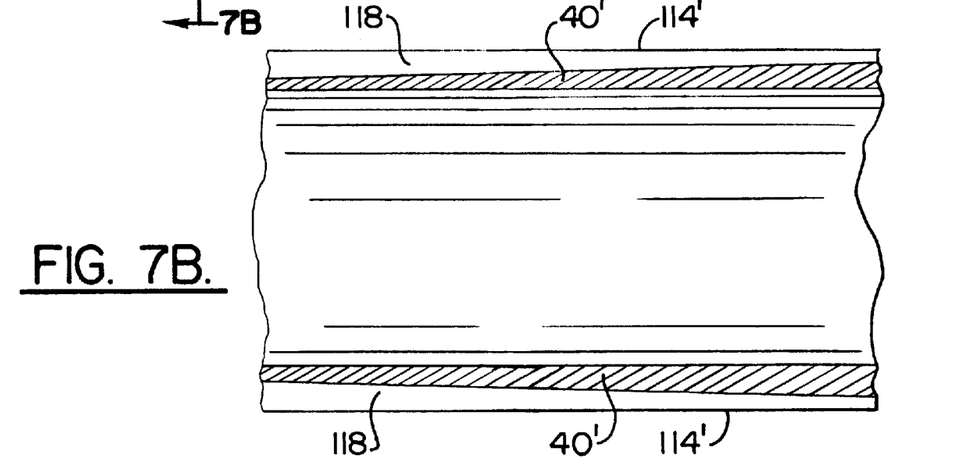
FIG. 7B is a cross-sectional view taken on line 7B—7B of FIG. 7A.

Alternatively, FIGS. 7A and 7B depict a configuration of a valve body 40' which allows variable size of the primary orifice 44 with a valve body 40' having a constant outer diameter along its length. The outer surface 114' of valve body 40' is sized such that the surface 114' makes sliding contact with the inner edge of the hole 42 in orifice plate 36 as the piston 18 is compressed and extended in cylinder 12. The outer surface 114' has axial grooves 118 formed in it. The primary orifice 44 is thus defined between the inner edge of hole 42 in orifice plate 36 and the grooves 118. By varying the depth of the grooves 118 along the length of valve body 40', the size of primary orifice 44 may be tailored to have any desired functional relationship to position of the piston 18. For instance, the grooves 118 may be made shallower in the region of valve body 40' which passes through the orifice plate 36 as the piston 18 approaches a fully compressed position, so as to maximize damping and prevent the piston 18 from bottoming in the cylinder 12.

In use in an aircraft landing gear during a landing mode, when the aircraft first touches down on a runway, the strut 10 begins to be compressed, and the bypass valve 110 is opened as shown in FIG. 3. Accordingly, damping is reduced and piston stroke is increased during the early part of the compression. As the limit of piston stroke is approached and oil pressure in the first oil chamber 46 increases, the gas spring 72 is increasingly compressed, and the bypass valve 110 is closed, as shown in FIG. 4. Thus, during the later part of the stroke, resistive damping force is increased. After the initial force of touchdown has been absorbed, if a tendency to rebound occurs, resistive damping takes place over a greater piston stroke, and rebound is thereby diminished.

It will be appreciated that the damping and spring characteristics of the shock strut 10 are dependent upon, among other factors, the sizes of primary orifice 44 and secondary orifices 106 and 108, pressure, volume, and viscosity of the oil in the oil chambers 46 and 48, and gas pressures and volumes within the gas springs 50 and 72. Accordingly, damping and spring characteristics may be tailored to meet desired design criteria by appropriate selection of these parameters. In particular, it will be appreciated that the performance of the bypass valve 110 may be selectively varied by pressurizing the gas chamber 86 to a greater or lesser extent so as to make gas spring 72 stiffer or softer. Furthermore, by providing the strut 10 with a suitable fitting, such as a one-way valve, which extends from outside the strut 10 into the gas chamber 86, variation in the stiffness of gas spring 72 may be accomplished while the strut 10 is installed in a vehicle suspension system. The gas spring 72 thus provides a significant advantage over a mechanical spring, since changing the stiffness of an internal mechanical spring would require dissassembly of the strut to replace the spring.

While the invention has been described by reference to a particular embodiment, and while this embodiment has been described in considerable detail, it is not the intention of applicant to restrict the scope of the invention to the particular embodiment and illustrative apparatus and method described. Those of ordinary skill in the art will recognize that the invention is subject to various modifications without departing from the scope of the invention. For example, while the strut which has been illustrated and described is an oleo-pneumatic strut including a gas spring 50 located in the closed end of the cylinder 12, the bypass valve 110 is equally suitable for use in an oleo strut having no gas spring 50. Furthermore, while the gas spring 72 and bypass valve 110 have been illustrated as being supported by the piston 18, alternative arrangements of the strut are possible wherein the gas spring 72 and bypass valve 110 are supported by the cylinder 12. Additionally, while the bypass valve 110 is illustrated as comprising a cylindrical valve body 40 and cylindrical valve pin 82, various other types of valve arrangements may be used. The scope of the invention, therefore, is to be determined by reference to the following claims.

That which is claimed is:

1. A hydraulic strut having over-pressure control, comprising:
   a hollow cylinder having a closed end and an open end and a hollow piston having a closed end and an open end, the open end of the piston telescopingly received within the cylinder, the piston and cylinder defining an oil-filled space therebetween;
   an orifice plate supported within the strut and dividing the oil-filled space into first and second oil chambers, the orifice plate defining a primary orifice for passage of oil between the first and second oil chambers;
   a gas spring defined by walls forming a gas chamber within one of the piston and the cylinder, the walls sealing the gas chamber from the oil chambers and including a diaphragm acted upon by oil pressure and being movable with respect to the one of the piston and the cylinder which houses the gas spring; and
   a bypass valve operatively connected to the diaphragm, the bypass valve connecting the first and second oil chambers, the bypass valve including a first valve member supported by the diaphragm for movement therewith and a second valve member fixed with respect to the one of the piston and the cylinder, partial compression of the strut causing oil pressure to move the diaphragm and thereby move the first valve member with respect to the second valve member so as to open the bypass valve.

2. The strut of claim 1 wherein the first valve member comprises a valve pin and the second valve member comprises a valve body into which the valve pin is telescopingly and slidably received, the valve body including a secondary orifice for oil to flow between the first and second oil chambers, the valve pin being responsive to motion of the diaphragm to as to slide within the valve body between a closed position in which oil cannot flow through the secondary orifice and an open position in which oil is permitted to flow through the secondary orifice.

3. The strut of claim 2 wherein the diaphragm is slidably mounted within a cylinder member affixed within the piston, the cylinder member supporting the valve body.

4. The strut of claim 3 wherein the orifice plate is annular and has a central hole therethrough and the valve body extends through the central hole, the primary orifice being defined between the orifice plate and the valve body.

5. The strut of claim 4 further comprising a valve body support member attached to the cylinder member, the valve body being attached to the valve body support member, the valve body support member including a diaphragm stop which extends into the cylinder member, the diaphragm which supports the valve pin abutting the diaphragm stop to define a fully extended position of the valve pin when the strut is in an uncompressed condition, the valve pin closing the secondary orifice when the valve pin is in the fully extended position.

6. The strut of claim 2 wherein the valve pin has an outer surface and a free end, the free end having a blind axial passage therein, the outer surface of the valve pin having an opening which extends into the axial passage, the bypass valve being opened by alignment of the opening in the valve pin with the secondary orifice in the valve body.

7. The strut of claim 6 wherein the valve body is an elongated hollow tubular member having a side wall and a central passage defined therein, and the secondary orifice extends through the side wall into the central passage, the central passage extending between the first and second oil chambers.

8. The strut of claim 7 wherein the side wall of the valve body includes a second secondary orifice axially spaced apart from the first secondary orifice, the outer surface of the valve pin having a second opening into the axial passage, the first and second openings in the valve pin being spaced apart to be simultaneously alignable with the first and second secondary orifices in the valve body.

9. The strut of claim 8 wherein the orifice plate and bypass valve are configured such that the second opening of the valve pin and the second secondary orifice of the valve body pass through the central hole of the orifice plate upon full compression of the strut so as to render the bypass valve inoperative and thereby maximize damping of the strut.

10. The strut of claim 1, further comprising a second gas spring including a generally cylindrical orifice support tube affixed to the closed end of the cylinder and a second diaphragm slidably mounted within the orifice support tube to define a second gas chamber which is sealed from the oil chambers, the orifice support tube supporting the orifice plate.

11. The strut of claim 10 wherein the orifice plate is annular and includes a central hole therethrough, the central hole having an inner edge, and the bypass valve includes an elongated valve member which extends through the central hole of the orifice plate, the valve member having an outer surface which makes sealing contact with the inner edge of the central hole, the outer surface including generally axial grooves therein, the primary orifice being defined between the inner edge of the central hole and the grooves.

12. The strut of claim 11 wherein the grooves have depths which vary in the axial direction.

13. A hydraulic strut having over-pressure control, comprising:

a hollow cylinder having a closed end and an open end and a hollow piston having a closed end and an open end, the open end of the piston telescopingly received within the cylinder, the piston and cylinder defining an oil-filled spaced therebetween;

an orifice plate supported within the strut and dividing the oil-filled space into first and second oil chambers, the orifice plate defining a primary orifice for passage of oil between the first and second oil chambers;

a gas spring defined by walls forming a gas chamber within the piston, the walls sealing the gas chamber from the oil chambers and including a diaphragm which is movable with respect to the piston; and     a bypass valve operatively connected to the diaphragm, the bypass valve connecting the first and second oil chambers, the bypass valve including a valve pin supported by the diaphragm for movement therewith and a tubular valve body fixed with respect to the piston and telescopingly receiving the valve pin therein, the valve body including first and second secondary orifices through a side wall thereof, the secondary orifices being longitudinally spaced apart along the valve body, the valve pin including a free end having a blind axial passage therein, the valve pin having an outer surface with first and second openings extending from the outer surface into the axial passage, the openings being longitudinally spaced apart to be simultaneously alignable with the secondary orifices in the valve body, the valve pin being movable by the diaphragm between a closed position in which the secondary orifices and openings of the bypass valve are misaligned, a partially open position in which one of the secondary orifices is aligned with one of the openings, and a fully open position in which both secondary orifices are aligned with both openings.

14. The strut of claim 13 wherein the diaphragm is slidably mounted within a cylinder member affixed within the piston, the cylinder member supporting the valve body.

15. The strut of claim 14 wherein the orifice plate is annular and has a central hole therethrough and the valve body extends through the central hole, the primary orifice being defined between the orifice plate and the valve body.

16. The strut of claim 15 further comprising a valve body support member attached to the cylinder member, the valve body being attached to the valve body support member, the valve body support member including a diaphragm stop which extends into the cylinder member, the diaphragm which supports the valve pin abutting the diaphragm stop to define a fully extended position of the valve pin when the strut is in an uncompressed condition, the valve pin closing both of the secondary orifices when the valve pin is in the fully extended position.

17. The strut of claim 15 wherein the orifice plate and bypass valve are configured such that the second opening of the valve pin and the second secondary orifice of the valve body pass through the central hole of the orifice plate upon full compression of the strut so as to render the bypass valve inoperative and thereby maximize damping of the strut.

18. The strut of claim 13, further comprising a second gas spring including a generally cylindrical orifice support tube affixed to the closed end of the cylinder and a second diaphragm slidably mounted within the orifice support tube to define a second gas chamber which is sealed from the oil chambers, the orifice support tube supporting the orifice plate.

19. The strut of claim 13 wherein the orifice plate is annular and includes a central hole therethrough, the central hole having an inner edge, and the valve body extends through the central hole and includes an outer surface which makes sealing contact with the inner edge of the central hole, the outer surface including generally axial grooves therein, the primary orifice being defined between the inner edge of the central hole and the grooves.

20. A method of controlling piston stroke and load during compression and extension of a hydraulic strut of the type having a hollow cylinder with a closed end and a hollow piston with a closed end, the open end of the piston being telescopingly received within the cylinder, the piston and cylinder defining an oil-filled space therebetween, an orifice plate within the strut dividing the oil-filled space into first and second oil chambers such that compression of the strut causes oil flow from the first to the second oil chamber, the orifice plate defining a primary orifice for passage of oil between the first and second oil chambers, the method comprising:

communicating oil pressure from the first oil chamber to a first side of a movable diaphragm disposed within the strut, a second side of the diaphragm being acted upon by gas pressure within a gas chamber disposed within the strut, the gas chamber being pressurized by a predetermined gas pressure when the strut is in a relaxed uncompressed condition, said predetermined gas pressure exceeding oil pressure within the first oil chamber in said uncompressed condition; and     opening a bypass valve by movement of the diaphragm caused by oil pressure in the first oil chamber exceeding said predetermined gas pressure by a preselected amount, the bypass valve connecting the first oil chamber to the second oil chamber, the opening of the bypass valve allowing oil to move between the first oil chamber and the second oil chamber without passing through the primary orifice.

21. The method of claim 20 wherein said opening step comprises moving a valve pin within a valve body into which the valve pin is telescopingly and slidably received, the valve body including a secondary orifice for oil to flow between the first and second oil chambers, the valve pin being responsive to motion of the diaphragm to as to slide within the valve body between a closed position in which oil cannot flow through the secondary orifice and an open position in which oil is permitted to flow through the secondary orifice, said opening step being accomplished by the diaphragm moving the valve pin to the open position.

22. The method of claim 20 wherein said opening step comprises moving a valve pin within a valve body into which the valve pin is telescopingly and slidably received, the valve body including first and second secondary orifices for oil to flow between the first and second oil chambers, the first and second secondary orifices being longitudinally spaced apart along the valve body, the valve pin including a free end with an axial passage therein and an outer surface having first and second openings therein which communicate with the axial passage, the first and second openings being longitudinally spaced apart along the valve pin so as to be simultaneously alignable with the first and second secondary orifices, the valve pin being responsive to motion of the diaphragm to as to slide within the valve body between a closed position in which the secondary orifices and openings of the bypass valve are misaligned, a partially open position in which one of the secondary orifices is aligned with one of the openings, and a fully open position in which both secondary orifices are aligned with both openings, said opening step comprising moving the valve pin to the partially open position upon occurrence of a first predetermined pressure differential across the diaphragm, and moving the valve pin to the fully open position upon occurrence of a second predetermined pressure differential across the diaphragm.

* * * * *